Patented May 10, 1932

1,857,844

UNITED STATES PATENT OFFICE

TURE ROBERT HAGLUND, OF STOCKHOLM, SWEDEN

PROCESS FOR PRODUCTION OF ALUMINUM OXIDE AND OTHER ALUMINUM COMBINATIONS

No Drawing. Application filed November 6, 1926, Serial No. 146,853, and in Sweden November 18, 1925.

This invention relates to the production of aluminum oxide and other aluminum combinations out of aluminum sulphidiferous material eventually material containing both aluminum sulphide and aluminum oxide. A process for the production of material of last named kind is described in the U. S. Patent specification No. 1,569,483.

According to this invention the sulphidiferous material is first so treated that the aluminum sulphide is converted into aluminum oxide or an aluminum oxide combination. This treatment is in the claims generally referred to under the word "oxidation" and can be done in different ways of which as an example may be mentioned decomposition by treating in the known way with water or steam, for instance after the formula:

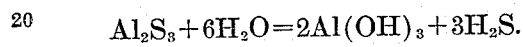
$$Al_2S_3 + 6H_2O = 2Al(OH)_3 + 3H_2S.$$

The products of decomposition are afterwards treated to remove impurities of such sulphides as sulphides of iron, titanium and calcium that are less soluble or quite insoluble. This is done according to this invention by treating the decomposition products with chlorine or chlorine combinations or also with other combinations of such metals that are precipitated, by sulphuretted hydrogen in acid solution, under such conditions that the metals in the impurifying sulphides wholly or partly are transformed into chlorides or other salts without more than a part of the aluminum combinations present in the decomposition products being transformed into aluminum chloride. Here below are mentioned a number of different processes to achieve this result, which processes among others are founded upon the fact that aluminum oxide and aluminum hydrate react very little with chlorine if they are not heated in the presence of reducing agent up to about 800 à 1000° C. and further thereupon that under certain conditions hydrochloric acid can not cause the formation of aluminum chloride, because this combination when heated in the presence of steam is broken up with the formation of aluminum oxide and hydrochloric acid. FeS and CaS on the other hand can, when treated with chlorine, easily be transformed to $FeCl_2$ or $FeCl_3$ and $CaCl_2$. Also titanium sulphides, specially when treated in heat with chlorine, can be transformed to titanium-chlorine combinations. The treatment with chlorine or chlorine combinations may occur either in a dry state or in the presence of water or steam. The treatment may be so carried out that chlorine or chlorine combinations, such as sulpho-chlorides, in gas form are led over the decomposition products which first may have been wholly or partly calcined. The impurities of for instance FeS, TiS, CaS are then being transformed to chlorides. The treatment may occur at such a low temperature, for instance 100° à 200° C., that the formed chlorides are not gasified. However, the treatment will go quicker if it occurs at such a high temperature that formed chlorides of iron and titanium are directly volatilized. To avoid oxidation of for instance the iron combinations it is suitable to carry out the treatment in neutral or reducing atmosphere. Instead of leading chlorine or chlorine combinations above, one may, especially when the decomposition products contain aluminum hydrate, mix them with aluminum chloride or by treatment with HCl transform a part of the aluminum hydrate to chloride and thereupon heat it in an atmosphere containing $H_2O$. The water may be obtained out of the moisture in the products, or from hydrate water given off at the heating, or by admittance of steam. At such heating for instance up to 300–400° C., the aluminum chloride is decomposed by action of the steam, thereby liberated hydrochloric acid decomposing impurities of sulphurous iron and and calicum sulphide under formation of ferrous chloride or calcium chloride respectively. The heating may be driven so far during or after the treatment that the aluminum hydrate is transformed to aluminum oxide difficult to dissolve in diluted acids. Out of the decomposition products treated with chlorine or chlorine combinations in the above mentioned way, formed and remaining chlorides may be dissolved out with water or diluted acids, whereupon the purified products containing aluminum oxide is dried or calcined or used in known ways for production of aluminum combinations.

As already mentioned above the treatment with chlorine or certain chlorine combinations may also occur in water, the decomposition products for instance by means of a stirrer being kept suspended in the water. The treatment may occur at common atmospheric pressure, or for instance in an autoclave at higher pressure, and the chlorine may be admitted either in the form of gas or dissolved in water or other dissolvant or in a state compressed to liquid. Also in this case sulphochlorides may with advantage be used instead of or together with chlorine. The chlorine combines in the reaction with iron in iron sulphide to form ferrous chloride that is dissolved. But aluminum hydrate does not react in a degree worth mentioning and remains substantially undissolved. Calcium sulphide is transformed to calcium chloride that is dissolved. The solution is afterwards filtered. To prevent the ferrous chloride formed in the solution from being oxidized during the treatment so that basic iron salts are precipitated, one must be careful that as little acid as possible accompanies the chlorine. One may also add special reducing agents, such as $H_2S$, or substances that with water develop $H_2S$, for instance a material containing $Al_2S_3$. In the case when the decomposition products contain any substance, with alkaline reaction it is for the same reason suitable to neutralize them with some acid before the treatment with chlorine or chlorine combinations.

If the decomposition products contain aluminum hydrate and besides impurities of sulphides soluble in acids, such impurities may be rendered harmless by a treatment with chlorine combinations of metals that are precipitated by sulphuretted hydrogen in acid solution, the treatment occurring in the presence of water for instance under heating. The iron in the iron sulphide or other such combination is dissolved in the form of a chlorine combination. As the formed sulphides are insoluble in acids the aluminum hydrate may—after separating the solution—be dissolved out by an acid, for instance sulphuric acid, whereby a solution containing aluminum free or comparatively free from impurities is received. Among chlorine combinations that in this case are suitable for the formation of sulphides insoluble in acids, may be mentioned chlorides of copper, lead, arsenic, antimony, tin. Instead of chlorides other combinations may also be used, such as sulphates or nitrates of such metals that are precipitated by sulphuretted hydrogen in acid solution.

If the decomposition products contain crystallized aluminum oxide in the form of corundum, it is suitable but not necessary by some wet dressing method to separate out the aluminum oxide crystals from the lighter decomposition products, such as aluminum hydrate, before the purification procedure and afterwards treat each different product separately. It is also suitable to treat the decomposition products in a strongly magnetic separator, such as the Ulrich separator, whereby metal impurities and some impurities of sulphides of heavy metals can be removed.

I claim:

1. Process for refining raw material containing aluminum oxide consisting in forming a slag containing aluminum sulphide, decomposing aluminum sulphide by treating the slag with water and removing impurities of sulphides by treating the decomposed slag while in suspension in water with chlorine.

2. Process for refining raw material containing aluminum oxide consisting in forming a slag containing aluminum sulphide, decomposing aluminum sulphide by treating the slag with water and removing impurities of sulphides by treating under pressure the decomposed slag in the presence of water with chlorine.

3. Process for refining raw material containing aluminum oxide consisting in forming a slag containing aluminum sulphide, decomposing aluminum sulphide in said slag through oxidation, thereupon decomposing sulphide impurities by treating the decomposed slag with a gaseous chlorinating agent and removing formed chloride combinations.

4. Process for refining raw material containing aluminum oxide consisting in forming a slag containing aluminum sulphide, decomposing the aluminum sulphide by treating the slag with water and thereupon decomposing impurities of iron sulphides by treating the decomposed slag with a gaseous chlorine combination in the presence of water vapour and removing formed chloride combinations.

5. Process for refining raw material containing aluminum oxide, consisting in forming a slag containing both aluminum sulphide and fused aluminum oxide, decomposing aluminum sulphide by treating the slag with water, separating out by a known mechanical dressing operation the fused alumina and thereupon removing the impurities of sulphides by treating the residual products from the separation with chlorine in the presence of water.

6. Process for refining raw material containing aluminum oxide consisting in forming a slag containing both aluminum sulphide and fused aluminum oxide, decomposing the aluminum sulphide by treating the slag with water and separating out by a known mechanical dressing operation the fused alumina, thereupon decomposing the impurities of iron sulphides by treating the residual products from the separation with a gaseous chlorine combination in the presence of water-vapour and removing the formed soluble chlorides.

7. Process for refining raw material containing aluminum oxide consisting in forming a slag containing aluminum sulphide, decomposing aluminum sulphide in said slag by oxidation, subjecting the decomposed slag to a treatment with a strongly magnetical apparatus for removing magnetically removable impurities, and thereupon removing impurities of sulphides by treating the decomposed slag with chlorine.

8. Process for refining raw materials containing aluminum oxide consisting in forming a slag containing aluminum sulphide, decomposing the aluminum sulphide by oxidation, causing a gaseous chlorinating agent to act on the sulphidic impurities of the decomposed slag and treating the same with water for the removal of the formed chlorides.

9. Process for refining raw material containing aluminum oxide consisting in forming a slag containing both aluminum sulphide and fused aluminum oxide, decomposing the aluminum sulphide in said slag through oxidation, separating by a known mechanical process based upon the difference in spec. gravity the fused aluminum oxide from the products formed by the decomposition of the aluminum sulphide and thereupon treating the latter products consisting of aluminum oxide compounds of lower spec. gravity than the fused aluminum oxide with chlorine for the purpose of chlorinating the sulphide impurities and then adding water for the removal of the chloride so formed.

10. Process for refining raw materials containing aluminum oxide consisting in forming by a reducing smelting operation under addition of sulphur containing materials a slag containing aluminum oxide and aluminum sulphide, decomposing the aluminum sulphide by oxidation, treating the decomposed mass with chlorine and removing the so formed soluble chlorides.

11. Process for refining raw materials containing aluminum oxide consisting in forming a slag containing both aluminum sulphide and aluminum oxide, decomposing the aluminum sulphide in said slag through oxidation, separating by a known mechanical process based upon difference in spec. gravity the fused and heavier aluminum oxide from the products formed by the decomposition of the aluminum sulphide having a lower spec. gravity and thereupon treating the latter products with chlorine for the purpose of chlorinating the sulphide impurities and then adding water for the removal of the chloride so formed.

12. Process for refining raw materials containing aluminum oxide, consisting in forming a slag containing both aluminum sulphide and fused aluminum oxide, decomposing aluminum sulphide by treating the slag with water, separating by a known mechanical dressing operation based upon difference in spec. gravity the fused and heavier alumina, thereupon removing the impurities of sulphides by treating the residual products from the separation with chlorine in the presence of water.

13. Process for refining raw materials containing aluminum oxide consisting in forming a slag containing both aluminum sulphide and fused aluminum oxide, decomposing the aluminum sulphide by treating the slag with water and separating out by a known mechanical dressing operation based on difference of spec. gravity the fused alumina, thereupon decomposing the impurities of iron sulphides by treating the residue products from the separation with a chlorine in the presence of water vapour and removing the formed soluble chlorides.

In testimony whereof I have hereunto set my hand.

TURE ROBERT HAGLUND.